(12) United States Patent
Pilpel et al.

(10) Patent No.: US 7,598,185 B2
(45) Date of Patent: Oct. 6, 2009

(54) COMPOSITE BALLISTIC PANELS AND METHOD OF USE

(75) Inventors: Edward D. Pilpel, Avon, CT (US);
Richard H. Holland, Manhattan Beach, CA (US); Steven R S Johnson, Montrose, CO (US)

(73) Assignee: Polystrand, Inc., Montrose, CO (US)

( * ) Notice: Subject to any disclaimer, the term of this patent is extended or adjusted under 35 U.S.C. 154(b) by 260 days.

(21) Appl. No.: 11/640,166

(22) Filed: Dec. 15, 2006

(65) Prior Publication Data

US 2007/0232168 A1  Oct. 4, 2007

Related U.S. Application Data

(60) Provisional application No. 60/750,761, filed on Dec. 15, 2005.

(51) Int. Cl.
*B32B 5/26* (2006.01)
(52) U.S. Cl. ............................. 442/135; 442/134; 2/2.5
(58) Field of Classification Search ................. 442/134, 442/135; 428/219, 900, 911; 2/2.5
See application file for complete search history.

(56) References Cited

U.S. PATENT DOCUMENTS 5,851,932 A  12/1998  Dickson et al.

FOREIGN PATENT DOCUMENTS

| DE | 19832255 A1 | 1/2000 |
|---|---|---|
| GB | 2276935 A | 10/1994 |
| NL | 8403529 | 6/1986 |
| WO | 00/18573 | 4/2000 |
| WO | WO 02/090866 A1 * | 11/2002 |

OTHER PUBLICATIONS

Search Report dated Oct. 2, 2008.

* cited by examiner

*Primary Examiner*—Arti Singh-Pandey
(74) *Attorney, Agent, or Firm*—Michand-Duffy Group LLP

(57) ABSTRACT

A panel had a first face and a second face, including a strike face portion having a first plurality of plies each containing fibers in a matrix material. There is a support portion adjacent to the strike face portion, the support portion containing a second plurality of plies each having fibers in a matrix material. Each ply is bound to an adjacent ply and the first fibers are lower-performing relative to the second fibers. Protection from a ballistic threat may be provided by providing such a panel with the strike face disposed toward the threat. In another aspect, a composite ballistic panel may contain fibers in a thermoplastic matrix material, to the substantial exclusion of thermosetting matrix materials.

11 Claims, 6 Drawing Sheets

COMPOSITE BALLISTIC PANELS AND METHOD OF USE

CROSS-REFERENCE TO RELATED APPLICATIONS

This application claims the benefit of U.S. provisional application No. 60/750,761, filed Dec. 15, 2005, which is hereby incorporated herein by reference.

BACKGROUND OF THE INVENTION

This invention relates to armor, and in particular to the manufacture of panels for use in armor.

Armor, or ballistic materials, for vehicles and personnel is finding ever increasing application in modern times. With respect to vehicles, armor has historically taken the form of metal plates, the thickness of which varies depending on the type of projectile the armor is designed to stop. As this metal armor gets thicker, the weight of the armor increases dramatically. Making the metal armor thinner while reducing weight will likewise reduce the ability of the armor to stop the intended projectile.

Other engineered materials, such as ceramics, have been employed as armor. However, these materials are also heavy and can be prohibitively expensive. Moreover, these materials are often difficult to form and can require costly molds and dies. In aircraft where minimizing weight is critical, it is sometimes impossible to use any armoring material. This leaves personnel and equipment subject to severe injury and damage.

Many different types of armor are now available that range in resistance from those designed to protect against small caliber handguns to those designed to protect against high-powered rifles. Ballistic resistant materials are used to fabricate portable ballistic shields, such as a ballistic clipboard for use by a police officer; to provide ballistic protection for fixed structures such as control rooms or guard stations; and to provide ballistic protection for the occupants of vehicles. Different types of ballistic materials can be used alone or in combination with one another depending on the intended threat protection.

Ballistic materials, including panels, are usually tested in accordance with standards that allow for consistent and meaningful evaluation of their performance, i.e., their ability to withstand ballistic impact. Such a standard has been established by the United States Department of Justice's National Institute of Justice and is entitled "NIJ Standard for Ballistic Resistant Protective Materials (hereinafter referred to as the "NIJ Standard"). The NIJ Standard is incorporated herein by reference. The ballistic threat posed by a bullet or other projectile depends, inter alia, on its composition, shape, caliber, mass, and impact velocity. Accordingly, the NIJ standard has classified the protection afforded by different armor grades as follows.

Type II-A (Lower Velocity 357 Magnum and 9 mm): Armor classified as Type II-A protects against a standard test round in the form of a 357 Magnum jacketed soft point, with nominal masses of 10.2 g and measured velocities of 381+/−15 meters per second. Type II-A ballistic materials also protect against 9 mm full metal jacketed rounds with nominal masses of 8 g and measured velocities of 332+/−12 meters per second.

Type II (Higher Velocity 357 Magnum; 9 mm): This armor protects against projectiles akin to 357 Magnum jacketed soft point, with nominal masses of 10.2 g and measured velocities of 425+/−15 meters per second. Type II ballistic materials also protect against 9 mm full metal jacketed rounds with nominal masses of 8 g and measured velocities of 358+/−12 meters per second.

Type III-A (44 Magnum, Submachine Gun 9 mm): This armor provides protection against most handgun threats, as well as projectiles having characteristics similar 44 Magnum, lead semiwadcutter with gas checks, having nominal masses of 15.55 g and measured velocities of 426+/−15 meters per second. Type III-A ballistic material also protects against 9 mm submachine gun rounds. These bullets are 9 mm full metal jacketed with nominal masses of 8 g and measured velocities of 426+/−15 meters per second.

Type III (High Powered Rifle): This armor protects against 7.62 mm (308 Winchester®) ammunition and most handgun threats.

Type IV (Armor-Piercing Rifle): This armor protects against 30 caliber armor piercing rounds with nominal masses of 10.8 g and measured velocities of 868+/−15 meters per second.

Other threats recognized in the art include Improvised Explosive Devices (IEDs), which may generate shrapnel that may be only a few grains in weight and may have velocities up to 5000 ft/sec.

In addition to these standards, other criteria such as the percentage of projectiles allowed to penetrate a particular ballistic material are also employed. One such test is the $V_{50}$ test as defined by MIL-STD-622, $V_{50}$ Ballistic Test for Armor. The final state of a witness plate placed behind the armor panel determines the experimental outcome of the ballistic test as shown in FIG. 1A and FIG. 1B. FIGS. 1A and 1B illustrate two situations occur as a result of the ballistic test: FIG. 1A illustrates partial penetration of the test panel 10, evidenced by lack of perforation of the "witness plate" 12; and FIG. 1B illustrates complete penetration of test panel 10, evidenced by visibility of light through the witness plate 12 by a projectile or spall from the test panel 10. The area corresponding to a velocity range causing a mixture of partial and complete penetration is the Zone of Mixed Results (ZMR).

The $V_{50}$ may be defined as the average of an equal number of highest partial penetration velocities and the lowest complete penetration velocities which occur within a specified velocity spread. A 0.020 inch (0.51 mm) thick 2024-T3 sheet of aluminum is placed 6±½ inches (152±12.7 mm) behind and parallel to the target to witness complete penetrations. Normally at least two partial and two complete penetration velocities are used to compute the $V_{50}$ value. Four, six, and ten-round ballistic limits are frequently used. The maximum allowable velocity span is dependent on the armor material and test conditions. Maximum velocity spans of 60, 90, 100, and 125 feet per second (ft/s) (18, 27, 30, and 38 m/s) are frequently used.

A ballistic material commonly used as a comparative reference for $V_{50}$ tests is known in the art as HJ1, and is known to comprise woven S-glass fibers in a phenol-type thermosetting matrix material.

When a phenol matrix material is used in a ballistic panel, the panel typically needs to be cured at 2100 psi for about an hour. In addition, the panel must be de-gassed to avoid the formation of voids (bubbles) in the panel. De-gassing leads to the release of volatile organic compounds (VOCs), which presents environmental concerns.

Another known ballistic material used as personal body armor comprises Kevlar aramid fabric that has been bonded with polyethylene in a process that is insufficient for the Kevlar fabric fibers to be encapsulated by the polyethylene.

Based on the foregoing, it is the general object of the present invention to provide a ballistic material that improves upon or overcomes the problems and drawbacks associated with the prior art.

SUMMARY OF THE INVENTION

A panel had a first face and a second face and comprises a strike face portion comprising a first plurality of plies each comprising first fibers in a first matrix material. There is a support portion adjacent to the strike face portion, the support portion comprising a second plurality of plies each comprising second fibers in a second matrix material. Each ply is bound to an adjacent ply and the first fibers are lower-performing relative to the second fibers.

A method for providing protection from a ballistic threat comprising providing a panel as described herein with the strike face disposed toward the threat.

DETAILED DESCRIPTION OF THE INVENTION

Figure 1A:
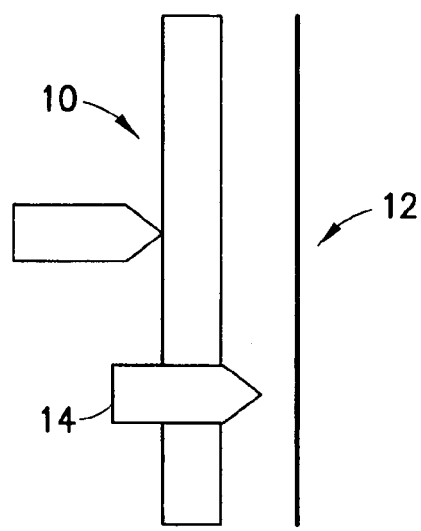
FIG. 1A is a schematic representation of partial penetration of an armor panel and an unaffected witness plate.
Figure 1B:
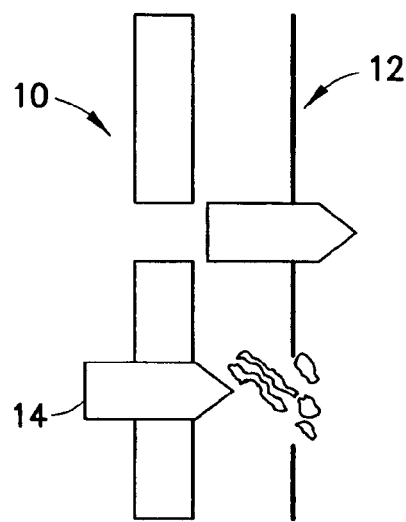
FIG. 1B is a schematic representation of complete penetration of an armor panel and an affected witness plate.

The present relates to composite ballistic panels that are useful as armor against a variety of projectiles, e.g., various firearm rounds, which constitute ballistic threats. Such panels have two faces, one of which serves as a "strike face," i.e., the face directed towards the threat and with which a projectile first comes into contact. The opposite face is referred to herein as the "back face." As used herein, "composite" means a combination of fibers and a matrix material in which the fibers are disposed; and "hybrid" indicates the use of more than one kind or type of fiber.

Various kinds of fibers can be used in a composite ballistic panel, including organic, inorganic and/or metallic fibers, either alone or in combination. For example, fibers comprised of polyaramid material such as, inter alia, those marketed under the trade names Kevlar, Twaron, and Technora may be used. In addition, other fiber types can be employed, such as, but not limited to basalt, glass (ECR, A and C, S- and E-, etc.), ultra-high molecular weight polyethylene (such as those marketed under the trade names Spectra and Dynema), carbon fibers (such as, but not limited to, fibers marketed under the trade names Toray, Fortafil and Zoltek), Boron, Silica Carbide, Liquid Crystal Polymer (LCP), such as, but not limited to LCP marketed under the trade name Vectran.

Different types of fibers perform differently from each other when separately formed into panels that are subjected to projectile impact. Some types of fibers yield panels that are less capable of withstanding ballistic impact, i.e., the fibers are "lower-performing," than other types of fibers, which may be deemed "higher-performing."

The phrase "different types of fibers" should be broadly construed to mean fibers made from different kinds of materials as well as fibers made from different grades of the same kind of material. For example, fibers of Kevlar 129 are lower-performing fibers in comparison to fibers made from a Kevlar 129 M.

The following types of fibers are given in order of increasing performance, with current representative costs: E-glass fibers ($0.80/pound), S-glass fibers ($8.00/lb.), Aramid polymer, e.g., Kevlar, fibers ($18.00/lb) and UHMWPE (ultra high molecular weight polyethylene) ($40-$80/lb.).

In one aspect, the present invention encompasses segregated hybrid composite ballistic panels. A hybrid composite ballistic panel comprises at least two different kinds of fibers are disposed, e.g., encapsulated, in at least one matrix material. The term "nonhybrid," as used herein, refers to panels or other materials that contain only a single kind of fiber. Segregated hybrid composite ballistic panels (or, simply, segregated hybrid panels) comprise lower-performing fibers concentrated in a portion (or stratum) of the panel at, or adjacent to, the strike face, referred to herein as the "strike face portion" of the panel. The remainder of the segregated hybrid panel comprises a "support portion," which is adjacent the strike face portion and which defines the back face of the panel; the higher-performing fibers are concentrated in the support portion of the panel. The support portion of a segmented hybrid panel may comprise a "back face stratum" that defines the back face of the panel and an internal stratum between the back face stratum and the strike face portion. Accordingly, in some embodiments, at least one of the back face stratum and the internal stratum of the panel contains the higher-performing fibers. Optionally, a panel may comprise more than two kinds of fibers. In such case, it is preferred, but not required, that the fibers be used in strata arranged from strike face to back face in order of increasing performance.

Each portion of a segregated hybrid panel comprises one or more composite plies of material. A composite ply comprises fibers disposed in a matrix material; a single composite ply is sometimes referred to as a "tape." A noncomposite ply is substantially free of fibers. A composite ballistic panel optionally comprises one or more noncomposite plies.

Both portions of a segregated hybrid panel may comprise a plurality of plies. Adjacent plies may adhere to each other due to the interaction of the matrix materials therein or they may be bound together by a binder or adhesive.

The matrix material in the plies of a segregated hybrid panel may comprise a thermoplastic material. Suitable thermoplastic materials include, but are not limited to, polypropylene, polyethylene, nylon, PEI (polyetherimide) and various copolymers. In one illustrative embodiment, polypropylene having a modulus of 300,000 is useful as a thermoplastic matrix material, although the invention is not limited in this regard. Various plies may have the same type of matrix material as each other or different types of matrix materials from each other. Optionally, fibers can be disposed in a first plurality of plies that comprise either a common matrix material or a variety of matrix materials. A second kind of fiber may be disposed a second plurality of plies that also have either a common matrix material or a variety of matrix materials. The matrix material(s) in the first plurality of plies may be the same or different from the matrix material(s) of the second plurality of plies.

Preferably, fibers within a tape or ply are substantially parallel to each other, and the panel comprises a plurality of plies with the fibers of one ply being disposed cross-wise in relation to fibers in an adjacent ply, for example, at an angle of up to 90° relative to the fibers in the adjacent ply. The fibers are evenly distributed across the ply. Generally, tape comprising fibers disposed in a thermoplastic matrix material is known in the art and is commercially available. In addition, cross-ply tapes or laminates, i.e., material comprising two plies of fibers in a matrix material with the fibers in one ply disposed at 90° to fibers in the other ply, are know in the art and are commercially available.

A panel may be constructed from a plurality of plies by piling a plurality of plies one on the next and subjecting the plies to heat and pressure, e.g., in a press, to meld adjacent plies together.

Figure 2:
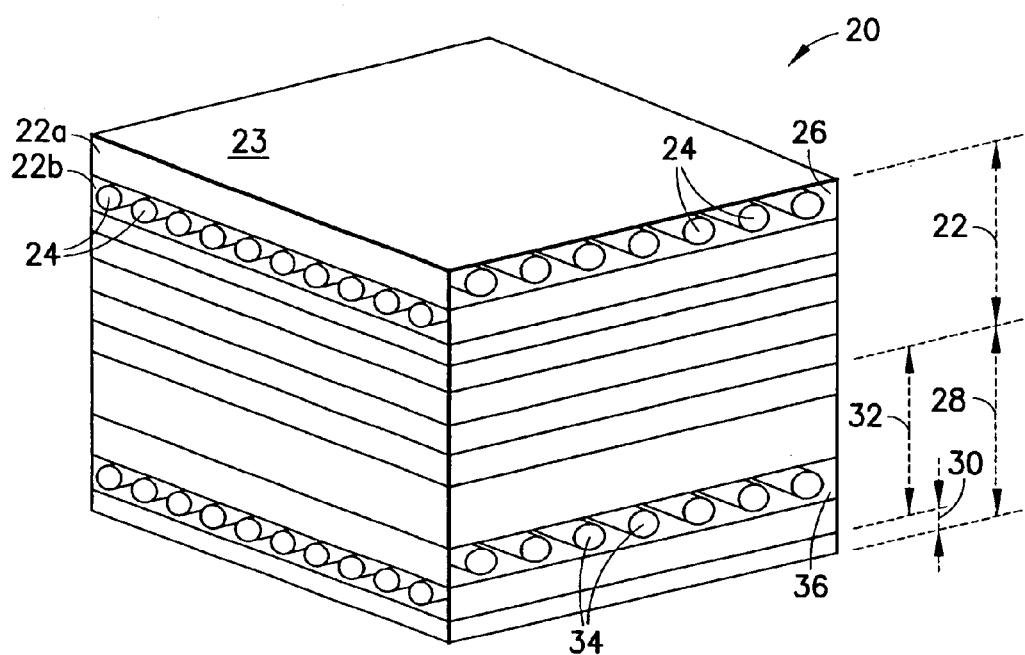
FIG. 2 is a schematic partly cross-sectional perspective view of a particular embodiment of a panel according to the present invention.

In an illustrative embodiment shown in FIG. 2, a panel 20 comprises a strike face portion 22 that comprises a first plurality of plies 22a, 22b, etc. and that provides the strike face 23 of the panel. The plies in portion 22 are composite plies that comprise respective pluralities of a first kind of fibers 24 disposed in a first matrix material 26. The fibers 24 are substantially parallel to each other within each ply and, as illustrated by plies 22a and 22b, the plies are disposed so that the fibers in one ply are arranged crosswise to fibers in the adjacent ply, in this case, at 90° to each other. Panel 20 also comprises a support portion 28 that comprise an optional back face stratum 30 and an internal portion 32. Internal portion 32 comprises a plurality of composite plies each comprising a second kind of fibers 34 in matrix material 36. Back face portion 30 comprises a noncomposite ply of matrix material that is substantially free of fibers therein. In other embodiments, the number of plies and their composition can be varied depending on the application. Panel 20 may be produced by stacking cross plies of tape comprising the first type of fibers and cross plies of tape comprising the second kind of fibers and the noncomposite ply and pressing them together as described herein.

respectively. For example, in one embodiment, a composite ply may comprise E-glass in a polypropylene matrix material. The fibers may have yield of 675 yards per pound of fiber and the fibers may comprise about 60-80% of the ply, by weight of the fibers plus matrix material. The matrix material may be polyethylene and/or polypropylene.

The following Table illustrates the advantage of a hybrid composite panel as described herein, by providing a comparison between such panel and nonhybrid panels that all provide NIJ Level III-A protection. Panel A comprises 19 crossplies of S-glass tape, has an areal weight of 2.5 lbs./sq.ft. and a thickness of 0.27 in. The panel is made by stacking the plies one on the next and subjecting the stack to pressure of 50 to 100 psi., for 5 to 10 minutes with heat sufficient to raise the temperature in the middle of the stack to 340-350° F., with cooling thereafter to 120-150° F. Panel B meets the same performance criterion as panel A, but it requires more plies of is significantly heavier and thicker and takes longer to manufacture. Panel C, the hybrid panel, meets the same criterion as panel A even though some of the S-glass plies are replaced by an equal number of E-glass plies, and even though Panel B shows E-glass plies, when used exclusively, are not as effective as S-glass plies. In addition, Panel C is less expensive to manufacture than Panel A due to the lower cost of E-glass tape. The data in this table can be used to project savings and material requirements for other panel weights as well. For example, to attain equivalent performance to an S-glass panel having twice the plies and an areal weight Panel A, a hybrid panel having twice the plies of Panel C can be used. Cycle times can be adjusted as needed to attain the desired temperatures.

| Panel | Matrix Material | Areal wt. (Lbs./Sq Ft) | Glass Type and number of cross plies of tape | Thickness (In). | Cycle Time (Min.) | Mold Pressure (Psi) | Heat to center temp. of (° F.) | Cool to center temp of (° F.) |
|---|---|---|---|---|---|---|---|---|
| A | Polypropylene (PP) | 2.5 | 19S | 0.27 | 5-10 | 50-100 | 340-350 | 120-150 |
| B | Polypropylene (PP) | 3.6 | 25E | 0.4 | 10-15 | 50-100 | 340-350 | 120-150 |
| C | Polypropylene (PP) | 2.5 | 9E+ 10S | .270 | 25-30 | 50-100 | 340-350 | 120-150 |

In one embodiment, ballistic panel 20 has a strike-face portion principally comprising E-glass fibers as the lower-performing fibers and a support portion comprising S-glass fibers as the higher-performing fibers. Depending on the performance criteria for a particular panel, the thickness of the panel and the relative thicknesses of the E-glass and S-glass portions of the panel can vary. Preferably, the S-glass plies and the E-glass plies are about equal in their weight contribution to the panel.

In specific embodiments, the E-glass fibers may comply with ASTM D578-98, paragraph 4.2.2, and may have a roving yield of about 250-675 yards/pound (yd/lb.), or a roving tex of about 735-1985 grams/kilometer (g/km). The S-glass fibers may comply with ASTM C 162-90 and/or ASM 3832B, and may comprise filaments of a diameter of about 9 micrometers, have a roving tex of 675-1600 g/km or a yield of about 310-735 yards/lb.

The content of a composite ply may be stated in terms of the yield of the fiber used and the proportions of weight of the ply the fibers contributed by the fibers and the matrix material, Formation of a panel from plies comprising thermoplastic matrix materials to the substantial exclusion of thermosetting matrix materials can be achieved at lower pressure and for shorter periods than are needed for a thermosetting matrix material to cure. In addition, panels comprised of plies containing thermoplastic matrix material require no degassing and generate little or no VOCs. Optionally, metals or ceramics or other materials can be added to a composite panel as described herein.

Depending on the composition of the segregated hybrid panel, different methods can be employed to bond the various layers together. These methods include using adhesives in the form of liquids, hot melts, reactive hot melts or films, epoxies, methylacrylates and urethanes. Sonic vibration welding and solvent bonding can also be employed.

In various embodiments, the hybrid ballistic panel of the present invention provides a lower cost ballistic panel relative to prior art panel composed entirely of composite materials incorporating thermosetting matrices and/or only high performance, expensive fibers. By employing thermoplastic matrices and one or more layers of lower-performing, less expensive fiber, the manufacturing and material costs of the ballistic panels was significantly reduced without loss of performance within specified parameters. In some cases, combining higher-performing fibers with lower-performing fibers in a hybrid composite panel as described herein, the performance of a nonhybrid panel containing only higher-performing fibers can be matched in a panel that is thinner and/or lighter than the nonhybrid panel. In addition, the hybrid panel is typically less expensive to manufacture than the nonhybrid panel. In other embodiments, the performance of the nonhybrid panel of high-performing fibers is matched with a hybrid panel having a lower content of high-performing fibers than the nonhybrid panel, and at a lower production cost.

In another broad aspect, the present invention encompasses thermoplastic composite ballistic panels. Such panels comprise a plurality of plies, each comprising fibers disposed in a thermoplastic matrix material, optionally to the substantial exclusion of thermosetting matrix materials such as phenol-type materials and polyester-type materials. A thermoplastic composite ballistic panel may contain a single kind of fiber.

Once fabricated, the composite ballistic panels of the present invention may be encapsulated by another composite, an elastomer, a metal housing etc. to protect against ultraviolet, moisture or other environmental influences. In addition, additives can be incorporated into the matrix material(s) for such things as fire resistance, smoke and toxicity resistance, and for cosmetic reasons. Moreover, metallic wires or wire mesh can be incorporated into individual layers or in the interfaces between layers.

The ballistic panels disclosed herein find use in providing protection from various kinds of ballistic projectiles, i.e., weaponry-based projectiles, shrapnel, and the like. For example, the ballistic panels find use in personal and vehicular armor and in fortifying buildings. The panels also provide protection against Improvised Explosive Devices (IEDs).

EXAMPLE 1

Figure 3:
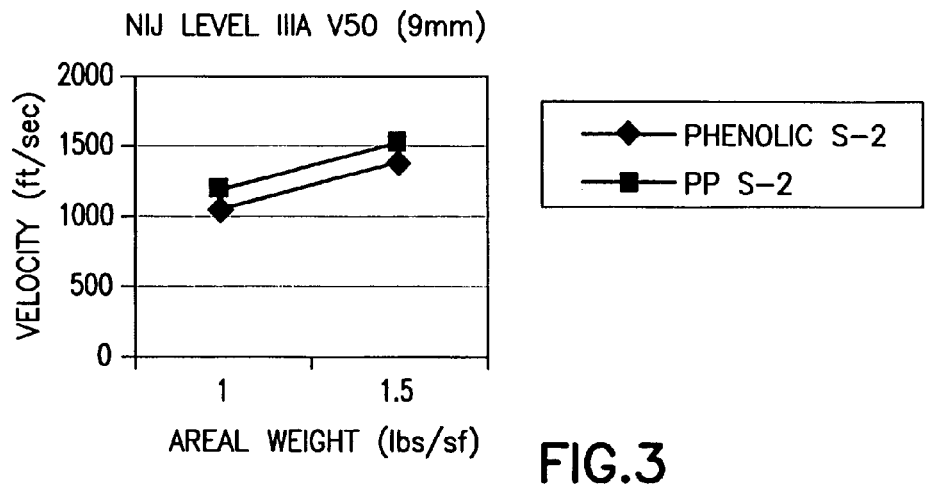
FIGS. 3-10 are plots of the $V_{50}$ performance of various panels at various areal weights indicated on the horizontal axes and projectile speeds on the vertical axes.

A first set of composite ballistic panels comprising S-glass fibers in a thermosetting phenol resin matrix material were produced by disposing the fibers in the resin and curing the resin. A second set of composite ballistic panels comprising like S-glass fibers in a polypropylene thermoplastic matrix material were also produced. The first and second sets of panels were tested for NIJ Level III-A protection using 9 mm shells to determine the panel weights required for $V_{50}$ performance at projectile velocities from about 1000 to about 1500 ft/s. The results of the tests are represented in the graph of FIG. 3, wherein the results for the first set are designated "Phenolic S-2" and the results for the second set are designated "PP S-2." FIG. 3 clearly shows that at various weights, the first set of panels achieve $V_{50}$ performance for higher velocity projectiles than the second set of panels, i.e., the weight performance of the first set of panels is better than that of the second set of panels. This is surprising because the phenolic matrix material, which cross-links when it cures, would be expected to have greater physical integrity and therefore contribute better to ballistic protection than a thermoplastic matrix material.

EXAMPLE 2

Figure 4:
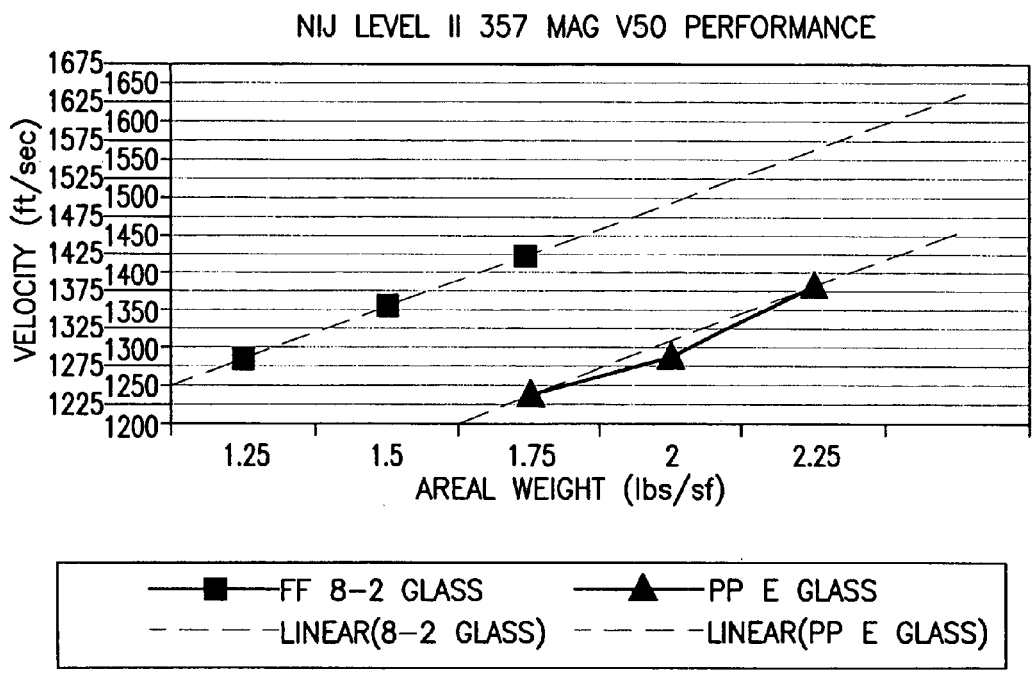

A first set of composite ballistic panels comprising S-glass fibers in a thermoplastic polypropylene matrix material were produced as described herein. A second set of composite ballistic panels comprising like E-glass fibers in a polypropylene thermoplastic matrix material were also produced. The first and second sets of panels were tested for NIJ Level II protection using 357 Magnum shells to determine the panel weights required for $V_{50}$ performance at projectile velocities from about 1200 to about 1450 ft/s. The results of the tests are represented in the graph of FIG. 4, wherein the results for the first set are designated "Phenolic S-2" and the results for the second set are designated "PPS-2." FIG. 4 clearly shows that the first set of panels achieve $V_{50}$ performance for higher velocity projectiles than the second set of panels.

EXAMPLE 3

Figure 5:
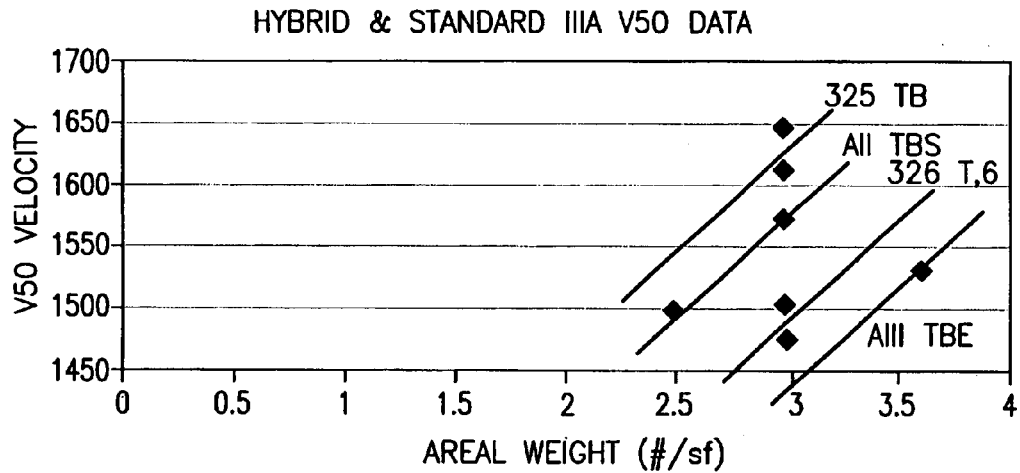

Several thermoplastic composite panels were produced, including a panel made from S-glass fibers (designated All TBS), a panel made from E-glass fibers (designated All TBE), and two hybrid composite panels having an E-glass portion and an S-glass portion as described herein. The panels were tested for NIJ Level III-A protection. One of the hybrid panels was positioned with the E-glass portion providing the strike face (this panel was designated 325T,B); the other was positioned with the S-glass portion providing the strike face (this panel was designated 326T,B). The panels had areal weights of 2-4 pounds per square foot, as indicated in FIG. 5, where the $V_{50}$ test results are shown. Surprisingly, FIG. 5 clearly shows that a hybrid composite panel of the same total weight as a nonhybrid panel gives superior performance when the lower-performing fibers provide the strike face, but that intermediate performance is seen when the higher-performing fibers provide the strike face.

EXAMPLE 4

Figure 6:
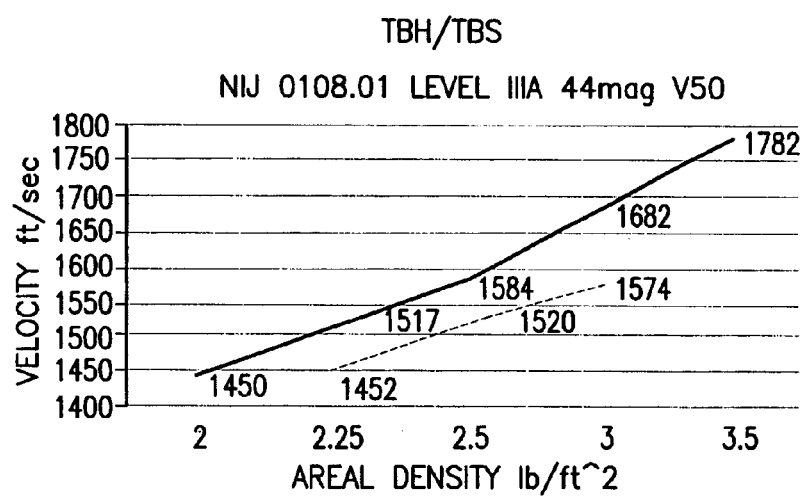

A first set of hybrid ballistic panels comprising S-glass fibers in a thermoplastic matrix material were produced as described herein, and were designated TBS. A second set of hybrid ballistic panels comprising like S-glass fibers and E-glass fibers in equal weights in a thermoplastic matrix material were also produced, and were designated TBH. Plies of the E-glass fibers in the TBH panels were all in a first portion of the panels and plies of the S-glass fibers were in a second portion of the panel. The first and second sets of panels were tested for NIJ 0108.01 Level III-A protection using 44 Magnum projectiles to determine the panel weights required for $V_{50}$ performance at projectile velocities from about 1400 to about 1800 ft/s. The TBH panels were tested with the first portion of the panels providing the strike faces for the projectiles. The results of the tests are represented in the graph of FIG. 6, which clearly shows that at various weights, the TBH panels achieve $V_{50}$ performance for higher velocity projectiles than the TBS panels. Accordingly, lighter TBH panels can achieve the same $V_{50}$ performance as heavier TBS panels. In other words, the weight performance of the TBH panels is superior to the performance of the TBS panels.

EXAMPLE 5

Figure 7:
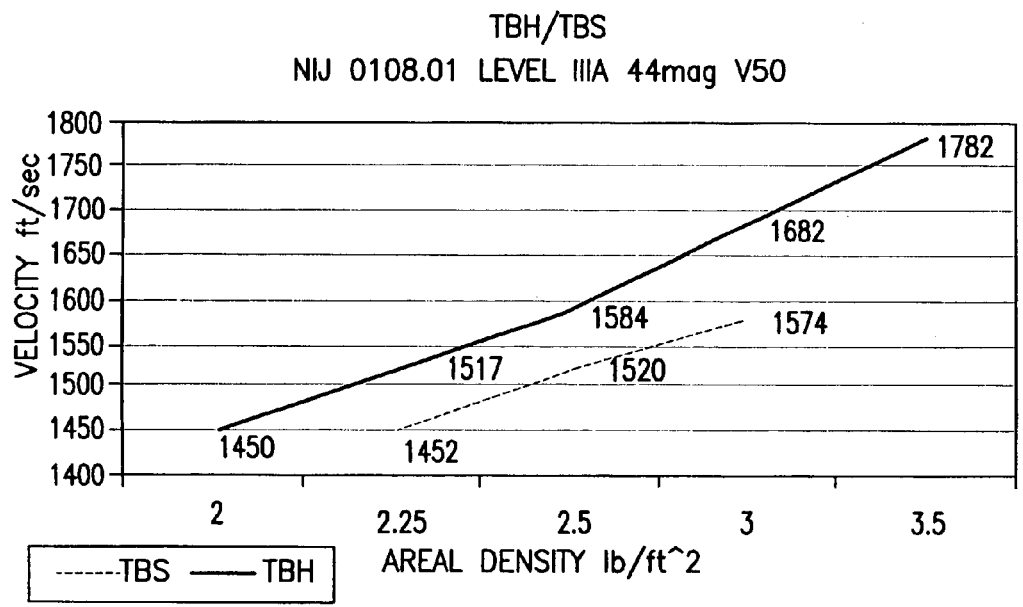

In another test of S-glass panels and hybrid E-glass and S-glass panels like that of Example 3, the $V_{50}$ performance weight of the hybrid panels for NIJ 0108.01 Level III-A protection using 44 Magnum projectiles was about the same as that of the S-glass panels, as seen in FIG. 7. However, the hybrid panels cost 40% less than the S-glass panels.

EXAMPLE 6

Figure 8:
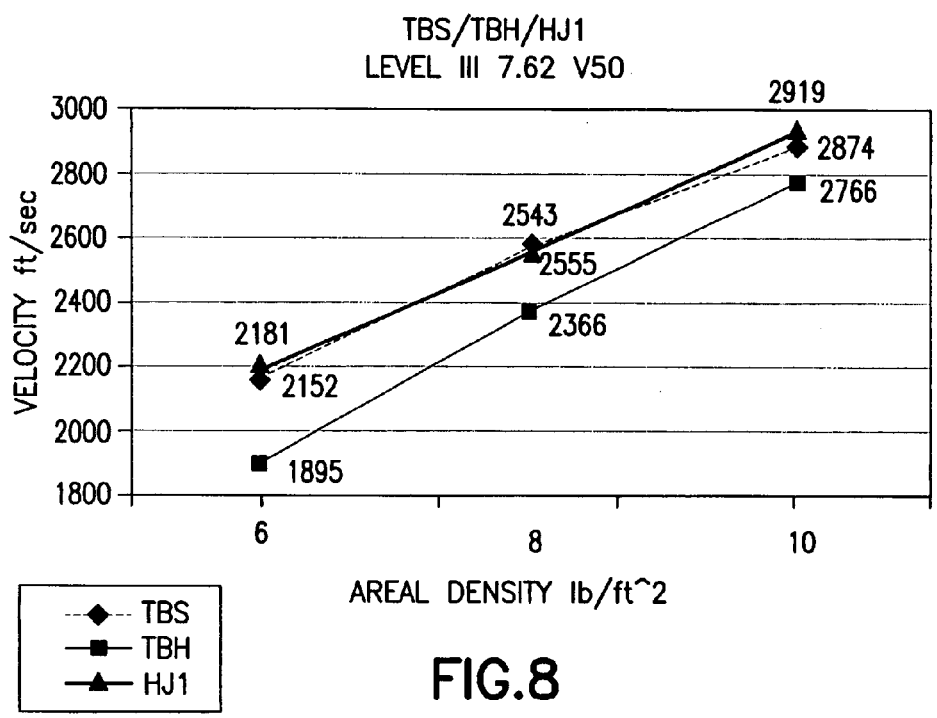

In still another test, S-glass panels, hybrid E-glass and S-glass panels and HJ1 panels were tested to determine the $V_{50}$ performance weights of the panels for NIJ Level II 7.62 mm munitions. In this test, the performance of the S-glass panels was about the same as the HJ1 panels, and the weight performance of the hybrid panels was inferior, as seen in FIG. 8. However, the hybrid panels cost significantly less than the S-glass panels and they are easier to produce than the HJ1 panels.

EXAMPLE 7

Figure 9:
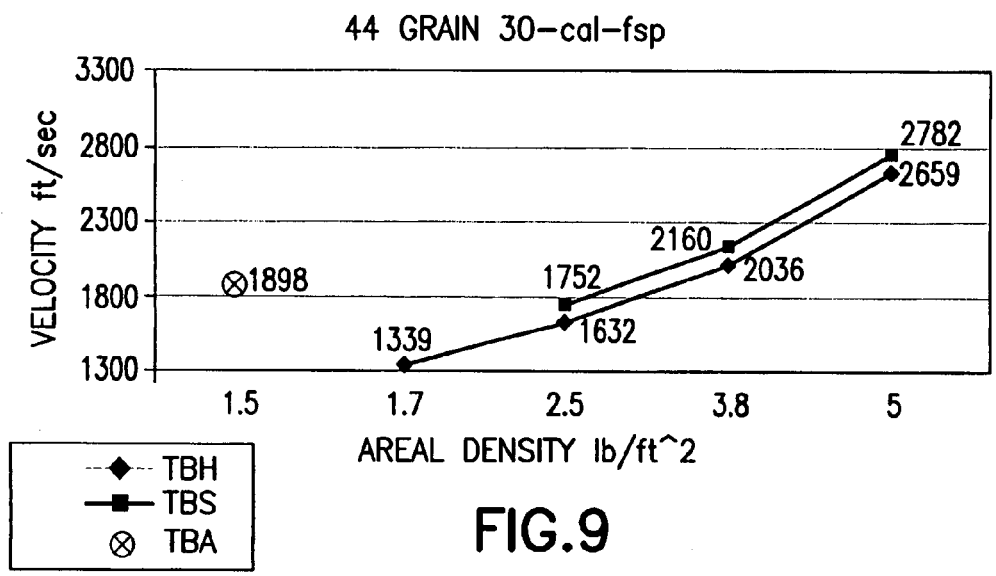

In another test, aramid fiber panels designated TBA, S-glass fiber panels designated TBS and hybrid panels designated TBH having a low-performing portion comprising S-glass fiber plies and a higher-performing portion comprising aramid fibers plies were tested to determine the $V_{50}$ performance weights of the panels for 44 grain 30-cal simulated shrapnel at velocities from about 1300 to 3300 ft/sec. In this test, the weight performance of the TBA panels was the best, followed by the performance of the TBS panels, followed lastly by the performance of the TBH panels, as seen in FIG. 9. However, the TBH panels cost significantly less than the TBA panels and TBS panels.

EXAMPLE 8

Figure 10:
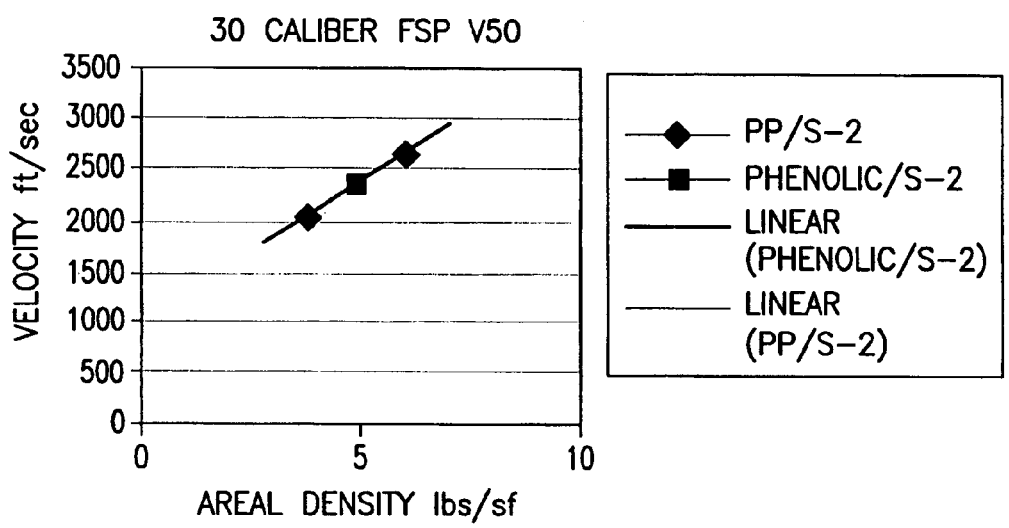

A first composite ballistic panel comprising S-glass fibers in a thermosetting phenol resin matrix material was produced by disposing the fibers in the resin and curing the resin, and designated Phenolic/S-2. A set of composite ballistic panels comprising like S-glass fibers in a polypropylene thermoplastic matrix material were also produced and designated PP/S-2. The panels were tested using 30 caliber simulated shrapnel to determine the panel weights required for $V_{50}$ performance at projectile velocities from about 2000 to about 2700 ft/s. The results of the tests are represented in the graph of FIG. 10, wherein the results for the Phenolic S-2 panel and the results for the d "PP S-2." FIG. 10 clearly shows that the PP S-2 panels achieve about the same $V_{50}$ performance as the Phenolic S-2 panels.

EXAMPLE 9

Three types of panels were prepared as described herein. One type was nonhybrid panels comprising aramid fibers (2820 denier K129-type). The remaining two were composite panels comprising equal weights of plies of aramid fiber as the higher-performing fiber and plies of S-2 glass (750 yield (yd/lb.) or E-glass (675 yield), respectively, as the lower-performing fibers. The aramid plies contained 90% fibers by weight, balance matrix material. The S-glass and E-glass plies both contained 80 wt. % glass fibers, balance matrix material. As noncomposite plies, the S-glass plies and E-glass plies formed noncomposite panels having the weights as follows:

| Lbs./sq.ft. | Number of S-glass cross plies | Number of E-glass cross plies |
|---|---|---|
| 2 | 8 | 7 |
| 2.5 | 10 | 9 |
| 3 | 12 | 11 |
| 3.5 | 14 | 12 |

The panels were all made to the same areal weight, and were tested to determine their $V_{50}$ velocities in a 30 caliber FSB test, using the lower-performing plies as the strike faces. The results are set forth in the following table.

| Panel | Strike Face | Back Face | Total Areal Weight | V50 Ft/sec. |
|---|---|---|---|---|
| E-glass/aramid Hybrid | .75 lb./sq.ft. E-Glass (80% by Weight) | .75 lb./sq.ft. Kevlar (90% by Weight) | 1.5#/sf Kevlar | 1738 |
| S-glass/aramid Hybrid | .75 lb./sq.ft S Glass (80% by Weight) | .75 lb./sq.ft Kevlar (90% by Weight) | 1.5 lb./sq.ft Kevlar | 1748 |
| Aramid only | 1.5 lb./sq.ft Kevlar (90% by Weight) | | 1.5 lb./sq.ft Kevlar | 1898 |

The data in the above table shows that the performance of the two hybrid panels was nearly the same as that of the aramid-only panel, despite the use of significant quantities of lower-performing fibers. The material cost for the hybrid panels was significantly less than for the aramid-only panel. The cost of the all aramid panel is $45 per sq. ft. based on a $30 per pound aramid laminate cost (not just fiber) and a E-glass/aramid hybrid panel based on E-glass cross ply laminate price of $2.50 per pound for a laminate yields a total cost $24.38 per square foot cost (1.5 lb./sq.ft. total areal weight). This provides about a 46% reduction in cost for a V50 that is only 8.4% less than all Kevlar.

Where use of the ballistic material is in aircraft or land vehicles, weight reductions translate into lower fuel consumption or higher load carrying capacity.

It is to be understood that the present invention is by no means limited to the particular construction herein disclosed and/or shown in the drawings, but also comprises any modifications or equivalents within the scope of the disclosure. The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

What is claimed is:

1. A panel having a first face and a second face and comprising:
   a strike face portion comprising a first plurality of plies each comprising E-glass fibers in a first polyolefin matrix material; and
   a support portion adjacent to the strike face portion, the support portion comprising a second plurality of plies each comprising S-glass fibers in a second polyolefin matrix material,
   wherein each ply is bound to an adjacent ply and wherein the first fibers are lower-performing relative to the second fibers.

2. The panel of claim 1, wherein the panel achieves at least one of the protection levels against a projectile as defined by NIJ Standard Armor grades II-A, II, III-A, III, and IV when the projectile is directed at the strike face.

3. The panel of claim 1 wherein the fibers that are substantially parallel to each other within their respective plies and wherein the plies are disposed so that fibers of each ply are disposed cross-wise to fibers of an adjacent ply.

4. The panel of claim 1, wherein the fibers are substantially parallel to each other within their respective plies and wherein the plies are disposed so that fibers of each ply are disposed cross-wise to fibers of an adjacent ply, and wherein the panel achieves at least one of the protection levels against a projectile as defined by NIJ Standard Armor grades II-A, II, III-A, III, and IV when the low-performing fibers are at the strike face.

5. The panel of claim 4, wherein the first polyolefin matrix material and the second polyolefin matrix material both comprise polypropylene.

6. The panel of claim 1, wherein the first polyolefin matrix material and the second polyolefin matrix material both comprise polypropylene.

7. The panel of claim 1, having an areal weight of about 1 to about 10 pounds per square foot.

8. The panel of claim 4, having an areal weight of about 1 to about 10 pounds per square foot.

9. The panel of claim 6, having an areal weight of about 1 to about 10 pounds per square foot.

10. A method of providing protection against a ballistic threat, comprising providing a panel according to claim 1 and disposing the panel with the strike face towards the threat.

11. The panel of claim 1, wherein the first plurality of plies principally comprise E-glass fibers and the second plurality of plies principally comprising S-glass fibers.

* * * * *